Figure 1:
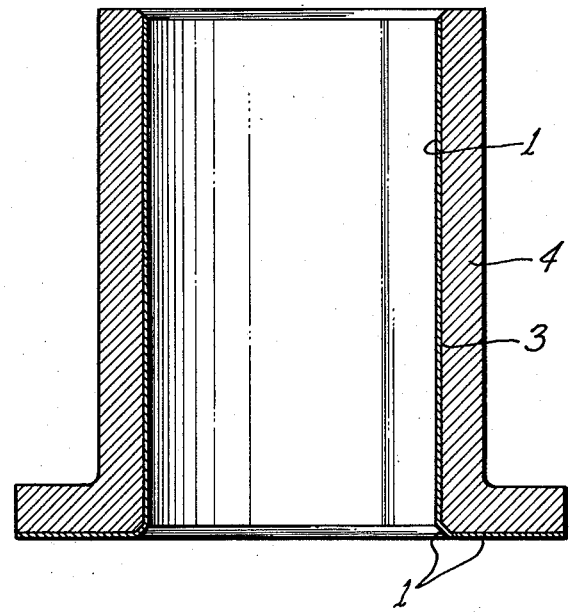

Nov. 3, 1964  E. A. GUZEWICZ  3,155,439
ANTI-FRICTION BEARINGS AND METHOD OF CONSTRUCTING SAME
Filed June 14, 1962  2 Sheets-Sheet 1

INVENTOR
EDMUND A. GUZEWICZ
BY
ATTORNEY 3,155,439
ANTI-FRICTION BEARINGS AND METHOD OF
CONSTRUCTING SAME
Edmund A. Guzewicz, Wallingford, Conn., assignor to
Chandler Evans Corporation, West Hartford, Conn., a
corporation of Delaware
Filed June 14, 1962, Ser. No. 202,590
11 Claims. (Cl. 308—241)

This invention pertains to anti-friction bearings and method of constructing same; more particularly the invention relates to bearing coatings, and especially to coatings for bearings to be used in high vacuum, high temperature, and high radiation environments.

With the advent of deep space vehicles, high vacuums and temperatures are now being encountered which heretofore have not been experienced. Gyros and other rotating machinery in these space vehicles are hard pressed for bearings of suitable designs and materials, since liquid hydrocarbon lubricants now used for such bearings quickly sublime and rapidly disintegrate in the extremely high vacuums encountered.

In addition, the problem of temperature is also a serious one, since local temperatures are getting to be close to 1000° F., and mechanical cooling and the like is too costly both in volume and weight to be considered.

There is a further need for suitable bearings in more conventional winged aircraft applications where either hydrodynamic or boundary layer lubrication is used. In these cases, quite often metal to metal contact is made and the bearing is required to operate in this condition for long periods of time.

Consequently, the basic problem to be solved is to devise a suitable bearing that will withstand vacuums in the order of $10^{-7}$ in.hg. and temperatures of 600° F. to 1000° F., and be capable of running "dry" with metal-to-metal contact for extended periods of time at more conventional altitudes and temperature environments.

Heretofore, the general method of construction of bearings, is to press and sinter metal powder with graphite powder additives. This results in a complete bearing sleeve which in turn is fitted into a metal sleeve or housing. However, pressed and sintered construction is brittle and often fails in service from impact, shock or shaft bending type loads.

My invention solves these problems by introducing a soft, solid, dry lubricant (e.g. graphite) into a high thermal conductivity, metal matrix of low hardness (e.g. bronze). This formulation is sprayed onto a hard steel sleeve and machined to a bearing finish, resulting in a steel backed bearing of requisite strength and capable of running without liquid lubricant.

My invention incorporates the graphite lubricant in a soft bearing metal matrix which is deposited by plasma spraying onto a hard metal (e.g. steel) sleeve, by means of a plasma gun, such as disclosed in U.S. Patent 2,922,869. When finish machined, the bearing is essentially a steel bearing with approximately .010" to .015" thick bearing coating. The thin coating provides a soft bearing surface with lubricant, but retains the rigidity and toughness of a hard metal sleeve. The customary sintered bearing is much thicker in order to maintain its shape and therefore is not as flexible.

Another advantage of my improved method of bearing construction is the higher heat transfer possible, due to the metallic fusion of the sprayed coating to the metal sleeve. Heretofore, bearing construction always has a finite clearance between the sintered bearing and its retention, and thereby has higher local heat resistance. This problem of heat dissipation is most important in bearing design as those skilled in the art understand.

My invention is unique in that it embodies a sprayed metal coating with free graphite carbon as a deposited constituent; and carbon does not have a liquid phase as most metals do, but sublimes into gas directly from a solid state. One of the cardinal features of my invention is a method of successfully depositing free graphite carbon, along with other common metals, and obtain a metallic fusion bond. This is new, novel and unique.

In the preferred method of my invention, the metal spraying is done with a plasma arc. Pure graphite carbon powder of approximately $+100$ mesh is mixed with bronze powder of approximately $-200$ $+325$ mesh. The mixture ratio being in order of 75% to 85% carbon and 15% to 25% bronze by volume. The preferred composition of the metallic bronze is approximately 93% copper, 5% tin, and 1.5% zinc, but these proportions can be varied within the limits generally comprising the generic term "bronze."

By extensive experimentation, I have discovered that when the above mixture is fed into a plasma spray gun, and the article to be coated is suitably sprayed, there results a deposited coating, having a free graphite carbon content of approximately 3%–5% by volume. The entire technique is to proportion the bronze and carbon, in relation to the plasma arc temperature and plasma flow, so that finite graphite carbon particles are entrapped along with the bronze particles, and are ultimately deposited in a random homogeneous dispersion which uniformally covers the treated surface. Excessive temperature must be avoided as this will sublime all the carbon, as will also improperly controlled variations in the other variables.

The plasma coating of the bearing sleeve with a bronze matrix having embedded therein graphite lubricant, is deposited to a greater thickness than the final desired thickness. This is to permit finish machining the bearing coating to exact geometric dimensions. I have empirically determined that a deposited coating of sufficient thickness to permit an excellent final thickness of .010" to .015", after finish machining is satisfactory. The finish machining operation consists of standard boring and turning operations with a single point cutting tool.

In the drawings, FIGURE 1 shows a typical example of pump rotor sleeve bearing constructed according to my invention. The sprayed coating on the running surfaces of the bearing, denoted by the reference numeral 1, is clearly visible in the sectioned piece.

Figure 2:
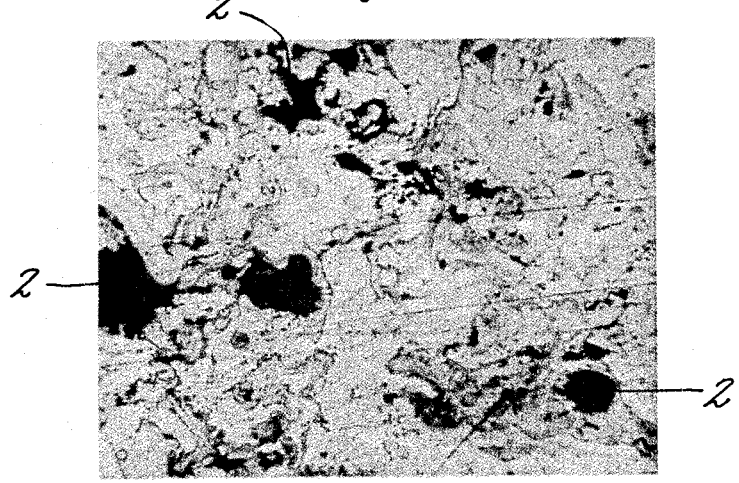
Figure 3:
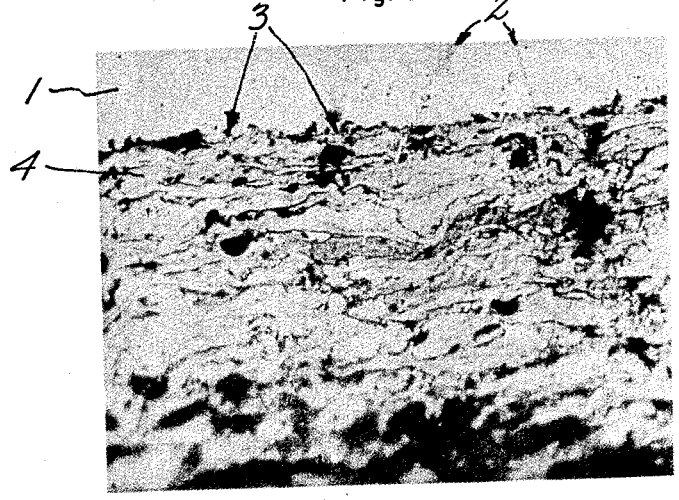

FIGURES 2 and 3 are respectively plan and sectional photomicrographs, showing the free carbon graphite carbon flakes, denoted by reference numeral 2, and the interface bond, denoted by reference numeral 3, between the sprayed coating 1, and the steel sleeve 4.

The bearings shown in the drawings have been tested in a fuel pump in which the rotor supported by the bearings has been rotated at about 6,000 r.p.m. for several hours with no lubrication at all. Also shear tests have been conducted for determining the coating adhesion strength, and the results show that the shear strength of the coating bond at the interface between the coating and steel sleeve is about 900 to 1000 pounds per square inch, which exceeds the shear strength of the coating itself.

While I have described and illustrated the preferred embodiment of my invention wherein the coating comprises a mixture of graphite carbon and bronze, it will be understood that the invention also comprises other embodiments, wherein the coating composition may consist of any other mixture formulations of graphite carbon and a metal having physical proportions similar to those of bronze. It will also be understood that while I have mentioned the bearing sleeve as being composed of steel, said sleeve may also consist of other rigid metals having requisite strength and suitable for use as bearings.

Although I have described and illustrated the preferred embodiment of my invention, I desire it to be understood that I do not limit the invention to the precise details of the method and construction shown by way of illustration, as these may be altered and modified by those skilled in the art without departing from the spirit of my invention, or exceeding the scope of the appended claims.

I claim:

1. A method of forming a self-lubricating rotor bearing comprising the following sequential steps: plasma-coating the working surface of a rigid metal sleeve with a fused, particulate mixture of a soft, solid, dry lubricant, and a metal of high thermal conductivity and low hardness, so that said mixture forms a bearing surface consisting of particles of free lubricant embedded in a matrix of said particulate metal; and machine finishing said coating to selected dimensions, such that said coating forms a relatively thin film, in which both said lubricant and said matrix metal contacts the surface of said rotor during its rotation in said bearing.

2. A method according to claim 1, wherein said lubricant consists of pure graphite carbon and said particulate metal consists of bronze.

3. A method according to claim 2, wherein said coating is formed by feeding said particulate mixture into a plasma spray gun, and spraying the working surface of said sleeve, so that there results a deposited coating having a free carbon content of approximately 3 to 5 percent, by volume.

4. A method according to claim 2, wherein said mixture comprises pure graphite carbon particles of approximately +100 mesh and bronze particles of approximately −200 to +325 mesh; said mixture ratio being in the order of 75 to 85 percent carbon, and 25 to 15 percent bronze, by volume.

5. A method according to claim 4, wherein said metal sleeve consists of steel, with which said coating forms a metallic fusion bond of greater shearing strength than that of said coating.

6. A method according to claim 5, wherein said coating operation is continued until said coating attains a thickness sufficient to produce a final thickness of .010 inch to .015 inch subsequent to machining.

7. A self-lubricating bearing comprising, a rigid sleeve, a coating having a working surface formed by a particulate mixture of dry lubricant and high thermal conductiivty metal said coating plasma fused to said rigid sleeve so that the interface region of said rigid sleeve and said coating has substantially the same heat transfer coefficient as the fused metals.

8. A self-lubricating bearing as defined in claim 7 in which said lubricant consists of pure graphite carbon and said particulate metal consists of bronze.

9. A self-lubricating bearing as defined in claim 8 in which said coating has a free carbon content of approximately 3 to 5 percent, by volume.

10. A self-lubricating bearing as defined in claim 9 in which said rigid sleeve consists of steel, said coating forming a metallic fusion bond with said steel sleeve of greater shearing strength than that of said coating.

11. A self-lubricating rotor bearing comprising a rigid metal support, a coating of a particulate mixture of a dry solid lubricant and a high thermal coefficient metal plasma fused and deposited on said rigid metal support and having a machined working surface, said coating fused to said rigid metal support so that the heat transfer coefficient in the interface region of said rigid support and said coating is the heat transfer coefficient of said fused metals.

References Cited by the Examiner

UNITED STATES PATENTS

| | | | |
|---|---|---|---|
| 1,768,529 | 6/30 | Short | 29—149.5 |
| 2,305,001 | 12/42 | Hammer | 29—149.5 |
| 2,362,353 | 11/44 | Cate | 29—149.5 |
| 2,465,051 | 3/49 | Adams et al. | 29—149.5 |
| 2,588,421 | 3/52 | Shepard | 117—71 |
| 2,922,869 | 1/60 | Giannini et al. | 219—75 |

WHITMORE A. WILTZ, *Primary Examiner.*

THOMAS H. EAGER, *Examiner.*